US011087719B2

(12) United States Patent
Qin et al.

(10) Patent No.: US 11,087,719 B2
(45) Date of Patent: Aug. 10, 2021

(54) METHOD AND SYSTEM FOR CORRECTING OSD TRIGGERING REGION OFFSET

(71) Applicant: SHENZHEN CHUANGWEI-RGB ELECTRONIC CO., LTD, Shenzhen (CN)

(72) Inventors: Jilei Qin, Shenzhen (CN); Wanle Ma, Shenzhen (CN)

(73) Assignee: SHENZHEN CHUANGWEI-RGB ELECTRONIC CO., LTD, Shenzhen (CN)

( * ) Notice: Subject to any disclaimer, the term of this patent is extended or adjusted under 35 U.S.C. 154(b) by 1 day.

(21) Appl. No.: 16/097,368

(22) PCT Filed: Aug. 15, 2016

(86) PCT No.: PCT/CN2016/095274
§ 371 (c)(1),
(2) Date: Oct. 29, 2018

(87) PCT Pub. No.: WO2017/206364
PCT Pub. Date: Dec. 7, 2017

(65) Prior Publication Data
US 2019/0147834 A1 May 16, 2019

(30) Foreign Application Priority Data
Jun. 2, 2016 (CN) .......................... 201610390749.0

(51) Int. Cl.
*G09G 5/38* (2006.01)
*G06F 3/041* (2006.01)
(52) U.S. Cl.
CPC ............... *G09G 5/38* (2013.01); *G06F 3/041* (2013.01); *G09G 2340/0492* (2013.01)
(58) Field of Classification Search
CPC ... G09G 5/38; G09G 2340/0492; G06F 3/041
See application file for complete search history.

(56) References Cited

U.S. PATENT DOCUMENTS 6,493,008 B1 * 12/2002 Yui .......................... G09G 5/08
348/E5.104
7,002,604 B1    2/2006 Barrus et al.
(Continued)

FOREIGN PATENT DOCUMENTS

CN       1584970 A    2/2005
CN     101043597 A    9/2007
(Continued)

OTHER PUBLICATIONS

The World Intellectual Property Organization (WIPO) International Search Report for PCT/CN2016/095274 dated Jan. 25, 2017 6 Pages.

*Primary Examiner* — Kee M Tung
*Assistant Examiner* — Khoa Vu
(74) *Attorney, Agent, or Firm* — Anova Law Group, PLLC

(57) ABSTRACT

A method and system for correcting OSD triggering region offset. Method comprises: when multimedia display device rotating is monitored, acquiring rotary angle parameter of multimedia display device; acquiring first coordinate parameter of OSD displaying region of multimedia display device according to rotary angle parameter; acquiring second coordinate parameter of OSD triggering region of multimedia display device, determining whether OSD displaying region coincides with OSD triggering region according to first coordinate parameter and second coordinate parameter, if not, redrawing OSD triggering region until OSD displaying region is detected coinciding with OSD triggering region, thus finishing correction of OSD triggering region offset. According to current screen rotation and coordinate parameter displayed by OSD, OSD triggering region is drawn by means of algorithm application, so OSD can be controlled (Continued)

and triggered accurately and normally, operation is simple, and present invention is convenient and practical.

11 Claims, 3 Drawing Sheets

(56) References Cited

U.S. PATENT DOCUMENTS

| | | | |
|---|---|---|---|
| 2002/0180812 A1* | 12/2002 | Kim | G06F 3/0481 |
| | | | 715/856 |
| 2005/0057497 A1* | 3/2005 | Kawahara | G06F 3/04815 |
| | | | 345/157 |
| 2009/0028453 A1* | 1/2009 | Collomosse | H04N 1/00307 |
| | | | 382/243 |
| 2012/0213492 A1* | 8/2012 | Takeuchi | H04N 13/183 |
| | | | 386/244 |
| 2015/0029224 A1* | 1/2015 | Ise | G06T 3/60 |
| | | | 345/649 |
| 2015/0160804 A1 | 6/2015 | Fujimoto et al. | |
| 2016/0080732 A1* | 3/2016 | Pedley | G06T 19/006 |
| | | | 345/8 |
| 2019/0096069 A1* | 3/2019 | Qian | G06T 7/74 |

FOREIGN PATENT DOCUMENTS

| | | |
|---|---|---|
| CN | 101057211 A | 10/2007 |
| CN | 103164197 A | 6/2013 |

\* cited by examiner

METHOD AND SYSTEM FOR CORRECTING OSD TRIGGERING REGION OFFSET

CROSS-REFERENCES TO RELATED APPLICATIONS

This application is a national stage application of PCT Patent Application No. PCT/CN2016/095274, filed on Aug. 15, 2016, which claims priority of Chinese Patent application No. 201610390749.0, filed on Jun. 2, 2016, the entire content of all of which is incorporated herein by reference.

FIELD OF THE INVENTION

The present invention relates to the field of digital multimedia display technology, and more particularly, to a method and system for correcting an OSD triggering region offset.

BACKGROUND

An OSD (On-Screen Display) in a digital multimedia display device has become one of a plurality of main windows to control the digital multimedia display device, but following a progress of a computer integrated circuit technology and a rapid development of a digital multimedia display technology, a plurality of diversifications on displays, including a normalized screen, an inversed screen and a flipped screen, has become a trend.

When the digital multimedia display device is conducting a rotation on a screen, including regularizing the screen, inversing the screen, and flipping the screen, an OSD triggering region deviates from a position of an OSD displaying region, resulting in a manipulation of a related OSD target region deviating from an original desired target contact region (the OSD displaying region), and making the OSD response error. Currently, according to such a problem, a display region scaling of the digital multimedia display device is adopted to solve the problem. However, a problem on the OSD triggering region deviating from the OSD displaying region, when inverting and flipping the screen, has not been solved fundamentally, and the display device has a phenomenon of a distortion and a triggering error.

Therefore, the current technology needs to be improved and developed.

BRIEF SUMMARY OF THE DISCLOSURE

According to the defects described above, the purpose of the present invention is providing a method and system for correcting an OSD triggering region offset, in order to solve a plurality of problems in the prior art that, due to the OSD triggering region deviating from the OSD displaying region when the screen is inversed and flipped, the display device shows a plurality of phenomena including the distortion and the triggering error.

In order to achieve the above mentioned goals, the technical solution of the present invention to solve the technical problems is as follows:

The present invention discloses a method for correcting an OSD triggering region offset, wherein the method comprises:

acquiring a rotary angle parameter of a multimedia display device when the multimedia display device is monitored rotating;

acquiring a first coordinate parameter for an OSD displaying region of the multimedia display device according to the rotary angle parameter;

acquiring a second coordinate parameter for an OSD triggering region of the multimedia display device, determining whether the OSD displaying region coincides with the OSD triggering region according to the first coordinate parameter and the second coordinate parameter, and if not, drawing the OSD triggering region again until the OSD displaying region is detected coinciding with the OSD triggering region, before finishing an correction for an OSD triggering region offset.

The method for correcting the OSD triggering region offset, wherein acquiring the rotary angle parameter of the multimedia display device when the multimedia display device is monitored rotating comprises specifically:

sampling a plurality of angle offset data of the multimedia display device in a predetermined time period, before quantizing the plurality of angle offset data and setting a rotation flag to tag a rotation;

acquiring a value of the rotation flag, and calculating the rotary angle parameter of the multimedia display device when the rotation is monitored.

The method for correcting the OSD triggering region offset, wherein acquiring the first coordinate parameter for the OSD displaying region of the multimedia display device according to the rotary angle parameter comprises specifically:

acquiring a porch region of the multimedia display device beforehand, before acquiring a rotation flag and a rotary angle parameter in the porch region;

acquiring a first horizontal axis starting coordinate and a first vertical axis starting coordinate of the OSD displaying region in the porch region, before acquiring a first horizontal coordinate offset and a first vertical coordinate offset of the OSD displaying region according to the rotary angle parameter.

The method for correcting the OSD triggering region offset, wherein acquiring the second coordinate parameter for the OSD triggering region of the multimedia display device, determining whether the OSD displaying region coincides with the OSD triggering region according to the first coordinate parameter and the second coordinate parameter, and if not, drawing the OSD triggering region again until the OSD displaying region is detected coinciding with the OSD triggering region, before finishing the correction of the OSD triggering region offset, comprises specifically:

Acquiring a second horizontal axis starting coordinate and a second vertical axis starting coordinate of the OSD triggering region of the multimedia display device, and acquiring a second horizontal coordinate offset and a second vertical coordinate offset of the OSD triggering region.

Comparing the first horizontal axis starting coordinate and the second horizontal axis starting coordinate, the first vertical axis starting coordinate and the second vertical axis starting coordinate, the first horizontal coordinate offset and the second horizontal coordinate offset, the first vertical coordinate offset and the second vertical coordinate offset in a turn, before determining whether they are a same:

If not, determining that the OSD displaying region does not coincide with the OSD triggering region, and drawing the OSD triggering region again, until the OSD displaying region is detected coinciding with the OSD triggering region, before finishing the correction of the OSD triggering region offset.

The method for correcting the OSD triggering region offset, wherein acquiring the second coordinate parameter for the OSD triggering region of the multimedia display device, determining whether the OSD displaying region coincides with the OSD triggering region according to the first coordinate parameter and the second coordinate parameter, and if not, drawing the OSD triggering region again until the OSD displaying region is detected coinciding with the OSD triggering region, before finishing the correction of the OSD triggering region offset, further comprises:

the multimedia display device prompts a drawing failure if a number of repeat times for drawing is greater than a predetermined number of times for drawing the OSD triggering region is detected.

A system for correcting the OSD triggering region offset, wherein comprises:

a monitoring and angle acquisition module, applied to acquiring a rotary angle parameter of the multimedia display device when the multimedia display device is monitored rotating;

an OSD displaying region coordinate parameter acquisition module, applied to acquiring the first coordinate parameter for the OSD displaying region of the multimedia display device, according to the rotary angle parameter;

an OSD triggering region offset correction module, applied to acquiring a second coordinate parameter for the OSD triggering region of the multimedia display device, determining whether the OSD displaying region coincides with the OSD triggering region according to the first coordinate parameter and the second coordinate parameter, and if not, drawing the OSD triggering region again until the OSD displaying region is detected coinciding with the OSD triggering region, before finishing the correction of the OSD triggering region offset.

The system for correcting the OSD triggering region offset, wherein the monitoring and angle acquisition module comprises specifically:

a data sampling unit, applied to sampling a plurality of angle offset data of at least one angle sensor in the multimedia display device within a predetermined time period, quantizing the plurality of angle offset data, and setting a rotation flag to mark the rotation.

a rotary angle parameter acquisition unit, applied to acquiring a value of the rotation flag, calculating the rotary angle parameter of the multimedia display device when the rotation is monitored.

The system for correcting the OSD triggering region offset, wherein the OSD displaying region coordinate parameter acquisition module comprises specifically:

a rotation data acquisition unit, applied to acquiring the porch region of the multimedia display device beforehand, before acquiring the rotation flag and the rotary angle parameter in the porch region;

a first coordinate parameter acquisition unit, applied to acquiring the first horizontal axis starting coordinate and the first vertical axis starting coordinate of the OSD displaying region in the porch region, and acquiring the first horizontal coordinate offset and the first vertical coordinate offset of the OSD displaying region according to the rotary angle parameter.

The system for correcting the OSD triggering region offset, wherein the OSD triggering region offset correction module comprises specifically:

a second coordinate parameter acquisition unit, applied to acquiring the second horizontal axis starting coordinate and the second vertical axis starting coordinate of the OSD triggering region of the multimedia display device, and acquiring the second horizontal coordinate offset and the second vertical coordinate offset of the OSD triggering region;

a data comparison unit, applied to comparing the first horizontal axis starting coordinate and the second horizontal axis starting coordinate, the first vertical axis starting coordinate and the second vertical axis starting coordinate, the first horizontal coordinate offset and the second horizontal coordinate offset, the first vertical coordinate offset and the second vertical coordinate offset in turn, determining whether they are the same;

a correction unit, applied to, if they are not the same, determining that the OSD displaying region does not coincide with the OSD triggering region and drawing the OSD triggering region again, until the OSD displaying region is detected coinciding with the OSD triggering region, before finishing the correction of the OSD triggering region offset.

The system for correcting the OSD triggering region offset, wherein the OSD triggering region offset correction module further comprises:

a detection and drawing unit, applied for the multimedia display device to prompting a drawing failure if the number of repeat times for drawing is greater than the predetermined number of the times for drawing the OSD triggering region is detected.

The present invention provides a method and a system for correcting an OSD triggering region offset, according to the rotation of a current screen and a coordinate parameter displayed by the OSD, the OSD triggering region is drawn by means of an algorithm operation, so that the OSD can be controlled and triggered accurately and normally. An operation is simple, convenient and practical.

DETAILED DESCRIPTION OF EMBODIMENTS

The present invention provides a method and a system for correcting an OSD triggering region offset, in order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
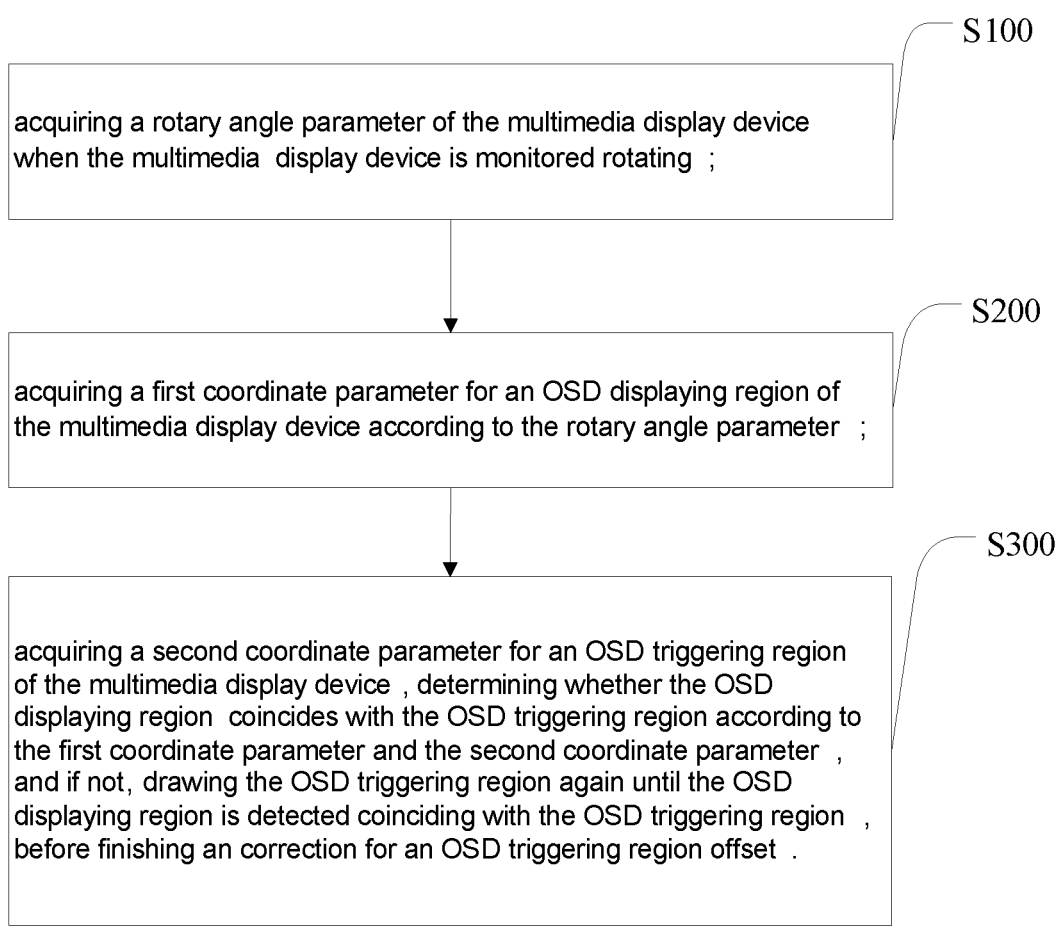
FIG. 1 illustrates a flow chart for a preferred embodiment of a method and a system for correcting an OSD triggering region offset in the present invention.

A digital multimedia display device displays a video, an OSD and more based on a display screen hardware physics, taking a high-definition liquid crystal screen as an example, a physical area on a screen consisting of 1920×1080 pixels is applied as a base area of the pixels, and a porch is a display area running according to an algorithm on and limited in the base area of the pixels, all parts displayed including the video and the OSD are limited to display in the porch, if a part that needs to be displayed is out of a range of the porch area, the part out of the range will not be displayed. A screen drive technology and a video display technology in the prior art has enabled a video and an OSD to be displayed in a porch at a manner of a normalized screen, when the screen is rotating to any one direction, including the screen is normalizing, inversing, and flipping. However, rotating a screen may cause the OSD triggering region deviate from the OSD displaying region, resulting in a response error on the OSD triggering and causing a fetal problem. The present invention further provides a flow chart on a preferred embodiment of a method for correcting an OSD triggering region offset, shown as FIG. 1, wherein, the method comprises:

step s100, acquiring a rotary angle parameter of the multimedia display device when the multimedia display device is monitored rotating;

step s200, acquiring a first coordinate parameter for an OSD displaying region of the multimedia display device according to the rotary angle parameter;

step s300, acquiring a second coordinate parameter for an OSD triggering region of the multimedia display device, determining whether the OSD displaying region coincides with the OSD triggering region according to the first coordinate parameter and the second coordinate parameter, and if not, drawing the OSD triggering region again until the OSD displaying region is detected coinciding with the OSD triggering region, before finishing an correction for an OSD triggering region offset.

In a specific embodiment, in the step s100, the normalized screen is applied as a standard display schematic diagram and a plurality of other directions are applied as a rotary state of the screen in the multimedia display device. A specific range for a rotation angle is 0-360 degrees. Wherein, when the rotation angle of the screen in the multimedia display device is 180 degrees, it is recorded as an inversed screen. And when the rotation angle of the screen in the multimedia display device is 270 degrees, it is recorded as a flipped screen. There is at least one sensor installed in the multimedia display device, so as to achieve an angle offset data of the multimedia display device through the at least one angle sensor.

In the step s200, acquiring the first coordinate parameter for the OSD displaying region of the multimedia display device according to the rotary angle parameter, wherein, the first coordinate parameter includes a starting coordinate before rotating and a coordinate offset after rotating of the OSD displaying region.

In the step s300, acquiring the second coordinate parameter of the OSD displaying region of the multimedia display device, wherein, the second coordinate parameter includes a starting coordinate before rotating and a coordinate offset after rotating of the OSD triggering region. Redraw the OSD triggering region according to a value of the first coordinate parameter and a value of the second coordinate parameter, until the OSD displaying region coincides with the OSD triggering region.

Figure 2:
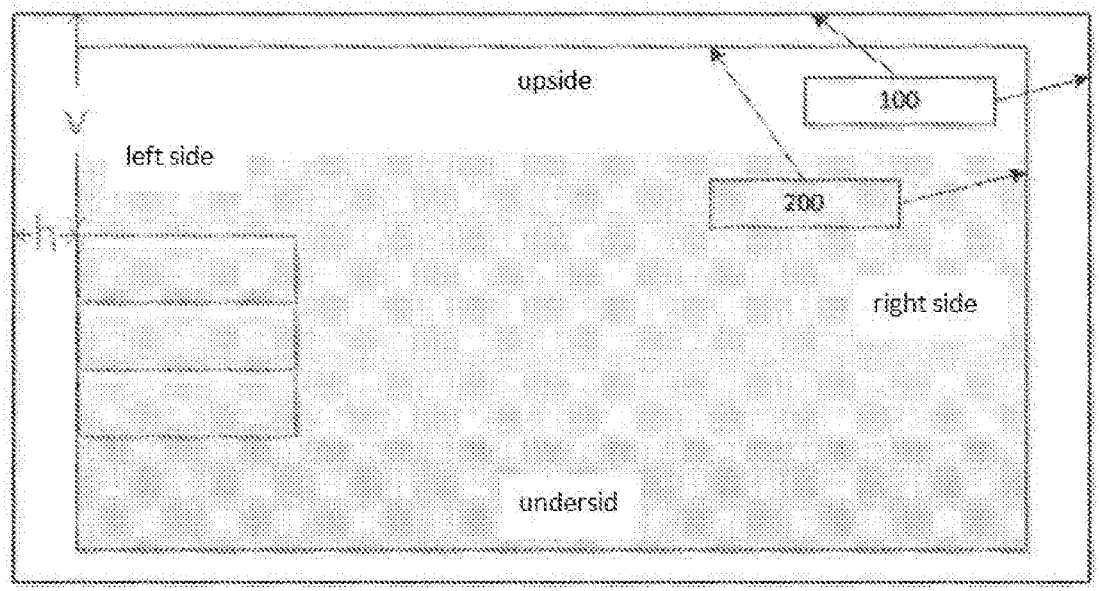
FIG. 2 illustrates a schematic diagram on a triggering state of a normalized screen OSD display of an embodiment on a method and a system for correcting an OSD triggering region offset according to the present invention.
Figure 3:
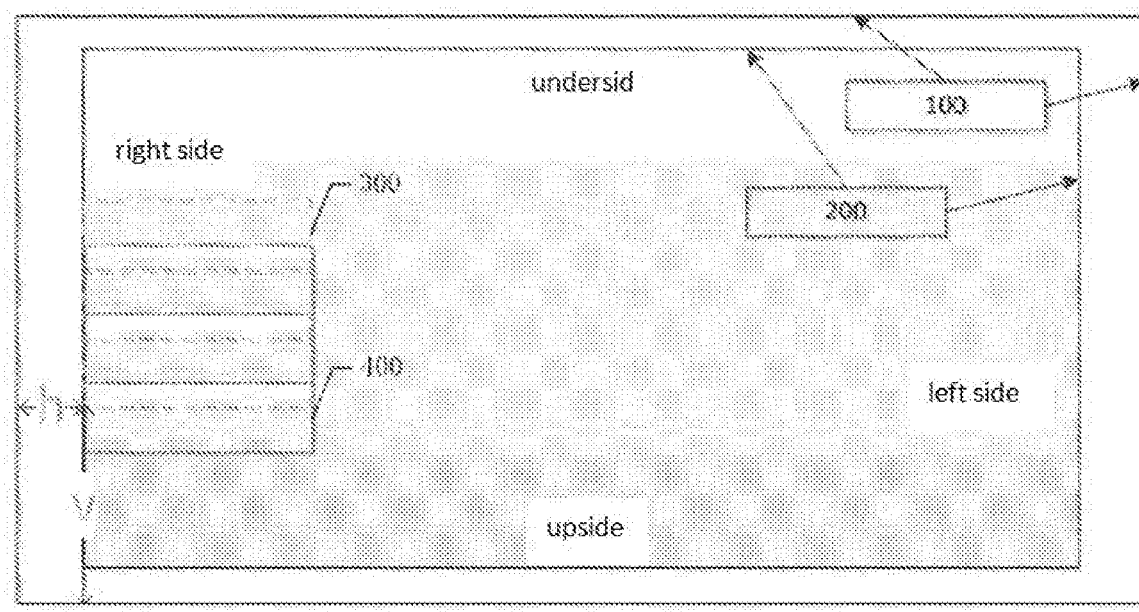
FIG. 3 illustrates a schematic diagram on a triggering state of an inversed screen OSD display of an embodiment on a method and a system for correcting an OSD triggering region offset according to the present invention.
Figure 4:
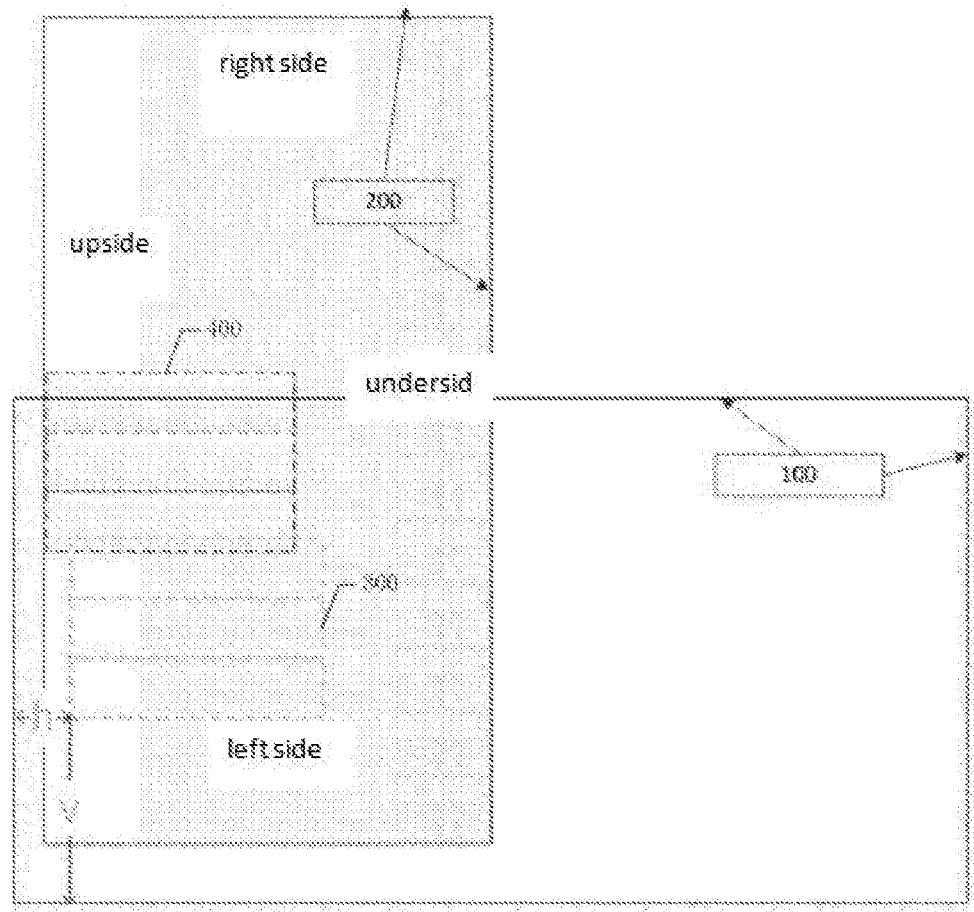
FIG. 4 illustrates a schematic diagram on a triggering state of a flipped screen OSD display of an embodiment on a method and a system for correcting an OSD triggering region offset according to the present invention.

FIG. 2 shows a schematic diagram on a triggering state of an OSD displaying on a normalized screen (0°/+360°/−360°). FIG. 3 shows a schematic diagram on a triggering state of an OSD displaying on an inversed screen (+180°/−180°). FIG. 4 shows a schematic diagram on a triggering state of a flipped screen (+270°/−90°). Wherein, 100 in a black dotted line represents a base area of the pixels, 200 represents a proch, 300 represents a response area for an OSD triggering, 400 represents an OSD displaying region.

From FIGS. 2, 3 and 4, it can be seen that a coordinate of the triggering region is drawn by moving the base area of the pixels, through an algorithm operation of offsetting +h units horizontally, and an operation of offsetting +v units vertically, wherein a sub item corresponding to an OSD may be triggered in a range of the coordinates; the OSD displaying region is anchored in a certain area of the "normalized screen" in the porch area during a screen rotation, making the screen not rotating subjectively. Comparing FIG. 3 and FIG. 4 to FIG. 2, when the screen rotates, an offset between the OSD displaying region and the triggering region may be clearly seen in the FIG. 3 and the FIG. 4. A coordinate of the OSD displaying region has been drawn in the porch area and a coordinate of an OSD region that is actually triggered has been drawn by offsetting the base area of the pixels, and once the screen rotates, a reference point position of the coordinates of the OSD displaying region and the OSD triggering region changes, resulting in the two regions having no overlapping.

Achieving the coordinates of the OSD triggering region has been changed from offsetting the base area of the pixels to algorithm operating the coordinates of the OSD displaying region in the porch area, thus a software needs to monitor the rotary angle of the digital multimedia display device, acquire the coordinate parameters of the OSD displaying region in the porch area, before setting the coordinates of the OSD triggering region by the algorithm operation, which is generated essentially from offsetting the OSD displaying region, finally making the OSD displaying region coincide with the OSD triggering region, thus achieving a phenomenon that the OSD displaying region will not deviate from the OSD triggering region due to the rotation of the display device.

Further, the step S100 comprises specifically:

Step S101, sampling a plurality of angle offset data from the at least one angle sensor in the multimedia display device in a predetermined period of time, quantizing the plurality of angle offset data, and tagging the rotation by setting a rotation flag;

Step S102, acquiring a value of the rotation flag, calculating a rotary angle parameter of the multimedia display device when it is monitored that the multimedia display device rotates.

In a specific embodiment, monitoring the multimedia display device rotating further comprises: sampling the plurality of angle offset data from the at least one angle sensor in the multimedia display device in a plurality of times, in a predetermined unit time period, quantizing the plurality of angle offset data, that is, acquiring a specific value of a degree of a current rotation from the at least one angle sensor, setting a rotation flag to tag the rotation, when the rotation flag is 1, it means that a present multimedia display device rotated, when the rotation flag is 0, it means that the present multimedia display device did not rotate. When it is monitored that the multimedia display device rotates, tagging the rotation flag as 1. When it is monitored that the rotation flag is 1, encoding and calculating the rotary angle parameter of the multimedia display device.

In a further embodiment, the step S200 comprises specifically:

Step S201, acquiring a porch region of the multimedia display device beforehand, before acquiring the rotation flag and the rotary angle parameter in the porch region;

Step S202, acquiring the first horizontal axis starting coordinate and the first vertical axis starting coordinate of the OSD displaying region in the porch region, and acquiring a first horizontal coordinate offset and a first vertical coordinate offset of the OSD displaying region according to the rotary angle parameter.

Specifically, acquiring the porch region of the base area of the pixels in the multimedia display device beforehand, acquiring the rotation flag, and acquiring the rotary angle parameter, setting a first horizontal axis starting coordinate X0, and a first vertical axis starting coordinate Y0 of an x axis and a y axis starting coordinate position of an OSD canvas according to the rotary angle parameter, acquiring a first horizontal coordinate offset $\Delta X$ and a first vertical coordinate offset $\Delta Y$ of the OSD displaying region, returning with data of the starting coordinate positions X0, Y0, and the offsets $\Delta X$, $\Delta Y$.

In a further embodiment, the step S300 comprises specifically:

Step S301, acquiring the second horizontal axis starting coordinate and the second vertical axis starting coordinate of the OSD triggering region of the multimedia display device, and acquiring the second horizontal coordinate offset and the second vertical coordinate offset of the OSD triggering region.

Step S302, comparing the first horizontal axis starting coordinate and the second horizontal axis starting coordinate, the first vertical axis starting coordinate and the second vertical axis starting coordinate, the first horizontal coordinate offset and the second horizontal coordinate offset, the first vertical coordinate offset and the second vertical coordinate offset in turn, determine whether they are the same;

Step S303, if they are not the same, determining that the OSD displaying region does not coincide with the OSD triggering region, drawing the OSD triggering region again, until the OSD displaying region is detected coinciding with the OSD triggering region, before finishing the correction of the OSD triggering region offset.

Specifically, acquiring a first horizontal axis starting coordinate X0, a first vertical axis starting coordinate Y0 and a first horizontal coordinate offset $\Delta X0$, a first vertical coordinate offset $\Delta Y0$ of the OSD displaying region, acquiring a second horizontal axis starting coordinate Xt0, a second vertical axis starting coordinate Yt0 and a second horizontal coordinate offset $\Delta Xt$, a second vertical coordinate offset $\Delta Yt$ of the OSD triggering region, comparing the starting coordinate: X0:Xt0; Y0:Yt0 and the offset: $\Delta X0:\Delta Xt$; $\Delta Y0$: $\Delta Yt$ between the OSD displaying region and the OSD triggering region, if the OSD displaying region does not coincide with the OSD triggering region, drawing the OSD triggering region again until the OSD displaying region is detected coinciding with the OSD triggering region, before finishing the correction of an OSD triggering region offset.

Further, the step S300 further comprises:

Step S31, the multimedia display device prompts a drawing failure if a number of repeat times for drawing is greater than a predetermined number of times for drawing the OSD triggering region is detected.

Specifically, a software design process of correcting the OSD triggering region offset due to the rotation of a multimedia screen is: when the OSD is called out by the system, the system monitors a rotation state of a present screen, if there is no rotation, a present triggering coordinate will be kept without drawing again; if it rotates, it is needed to draw the OSD triggering region again according to the rotary angle and the offset coordinate between the OSD displaying region and a present porch region, before comparing the coordinates of the OSD displaying region and the OSD triggering region again, if they are coincident, a drawing is completed and a process of monitoring the rotation of the screen is continue, if they are not coincident, drawing the OSD triggering region again, when a time of drawing failure is more than 3, prompting to make an operation of screen normalization and returning.

This scheme has been tested on an Android intelligent equipment, a Linux intelligent equipment and a plurality of other digital multimedia devices, results have shown that any rotation of the screen may make the OSD displaying region coincide with the OSD triggering region, and the software runs steadily. A plurality of adjustments to the OSD settings are accurate and effective.

The technical scheme of the present invention has a plurality of breakthroughs following:

a. By adopting this technology, it solves a problem that an OSD triggering region and an OSD displaying region are deviating from each other due to a screen size and a screen rotation. Through the current screen rotation, and the coordinate parameters of the OSD displaying, and through the algorithm operation, the OSD triggering region is drawn, making both manipulating and triggering the OSD be accurate and normal.

b. With a rapid development of the digital multimedia display technology, a speed of a hardware development and replacement is accelerating day by day. A software needs to adapt to a technical challenge brought by a hardware update. It provides a new solution of a single reference scheme to the porch region from an angle of software. The technology of correcting an OSD triggering region offset due to the rotation of the multimedia display device has enabled to handle the problem of the deviation of the OSD triggering region in essence.

Figure 5:
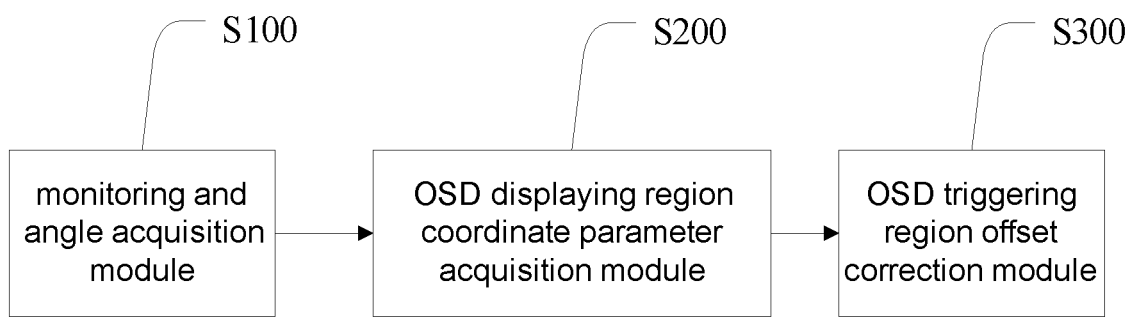
FIG. 5 illustrates a block diagram on a functional principle of a preferred embodiment of a method and a system for correcting an OSD triggering region offset according to the present invention.

The present invention further provides a block diagram on a functional principle of a preferable embodiment of the system for correcting the OSD triggering region offset, as shown in FIG. 5, wherein the system comprises:

a monitoring and angle acquisition module 100, applied to acquiring a rotary angle parameter of the multimedia display device when the multimedia display device is monitored rotating; details have been described in the embodiments on the method described above.

An OSD displaying region coordinate parameter acquisition module 200, applied to acquiring the first coordinate parameter for the OSD displaying region of the multimedia display device, according to the rotary angle parameter; details have been described in the embodiments on the method described above.

An OSD triggering region offset correction module 300, applied to acquiring a second coordinate parameter for the OSD triggering region of the multimedia display device, determining whether the OSD displaying region coincides with the OSD triggering region according to the first coordinate parameter and the second coordinate parameter, and if not, drawing the OSD triggering region again until the OSD displaying region is detected coinciding with the OSD triggering region, before finishing the correction of the OSD triggering region offset; details have been described in the embodiments on the method described above.

The system for correcting the OSD triggering region offset, wherein the monitoring and angle acquisition module comprises specifically:

a data sampling unit, applied to sampling the plurality of angle offset data of the at least one angle sensor in the multimedia display device within a predetermined time period, quantizing the plurality of angle offset data, and setting a rotation flag to mark the rotation; details have been described in the embodiments on the method described above.

a rotary angle parameter acquisition unit, applied to acquiring a value of the rotation flag, and calculate the rotary angle parameter of the multimedia display device when a rotation is monitored; details have been described in the embodiments on the method described above.

The system for correcting the OSD triggering region offset, wherein the OSD displaying region coordinate parameter acquisition module comprises specifically:

a rotation data acquisition unit, applied to acquiring the porch region of the multimedia display device beforehand, before acquiring the rotation flag and the rotary angle parameter in the porch region; details have been described in the embodiments on the method described above.

a first coordinate parameter acquisition unit, applied to acquiring the first horizontal axis starting coordinate and the first vertical axis starting coordinate of the OSD displaying region in the porch region, and acquiring the first horizontal coordinate offset and the first vertical coordinate offset of the OSD displaying region according to the rotary angle parameter; details have been described in the embodiments on the method described above.

The system for correcting the OSD triggering region offset, wherein the OSD triggering region offset correction module comprises specifically:

a second coordinate parameter acquisition unit, applied to acquiring the second horizontal axis starting coordinate and the second vertical axis starting coordinate of the OSD triggering region of the multimedia display device, and acquiring the second horizontal coordinate offset and the second vertical coordinate offset of the OSD triggering region; details have been described in the embodiments on the method described above.

a data comparison unit, applied to comparing the first horizontal axis starting coordinate and the second horizontal axis starting coordinate, the first vertical axis starting coordinate and the second vertical axis starting coordinate, the first horizontal coordinate offset and the second horizontal coordinate offset, the first vertical coordinate offset and the second vertical coordinate offset in turn, determining whether they are the same; details have been described in the embodiments on the method described above.

a correction unit, applied to, if they are not the same, determining that the OSD displaying region does not coincide with the OSD triggering region and drawing the OSD triggering region again, until the OSD displaying region is detected coinciding with the OSD triggering region, before finishing the correction of the OSD triggering region offset; details have been described in the embodiments on the method described above.

All above, the present invention provides a method and a system for correcting an OSD triggering region offset, The method comprises: when it is monitored that a multimedia display device rotates, acquiring a rotary angle parameter of the multimedia display device; acquiring a first coordinate parameter of an OSD displaying region of the multimedia display device according to the rotary angle parameter; and acquiring the second coordinate parameter of the OSD triggering region of the multimedia display device, determining whether the OSD displaying region coincides with the OSD triggering region according to the first coordinate parameter and the second coordinate parameter, and if not, drawing the OSD triggering region again until the OSD displaying region is detected coinciding with the OSD triggering region, thus finishing the correction of an OSD triggering region offset. According to the rotation of a current screen and a coordinate parameter displayed by the OSD, an OSD triggering region is drawn by means of an algorithm application, so that the OSD can be controlled and triggered accurately and normally, the operation is simple, and the present invention is convenient and practical.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A method for correcting an on-screen display (OSD) triggering region offset, wherein the method comprises:
    acquiring a rotary angle parameter of a multimedia display device when the multimedia display device is monitored rotating;
    acquiring a first coordinate parameter for an OSD displaying region of the multimedia display device according to the rotary angle parameter;
    acquiring a second coordinate parameter for an OSD triggering region of the multimedia display device, the OSD triggering region being a response area on the multimedia display device configured to be triggered for responding to OSD-related contact manipulation;
    determining whether the OSD displaying region coincides with the OSD triggering region according to the first coordinate parameter and the second coordinate parameter when the multimedia display device is monitored rotating, wherein the OSD displaying region deviating from the OSD triggering region due to rotation of the multimedia display device causes OSD touch response trigger error and display distortion; and
    in response to the OSD displaying region not coinciding with the OSD triggering region, performing:
        determining whether a number of repeating drawing reaches a threshold number;
        in response to the number of repeating drawing the OSD not reaching the threshold number, drawing the OSD triggering region again until the OSD displaying region is detected coinciding with the OSD triggering region or until the number of repeating drawing the OSD reaching a threshold number, before finishing a correction for an OSD triggering region offset; and
        in response to the number of repeating drawing the OSD reaching the threshold number, prompting a drawing failure message for an operation of screen normalization.

2. The method for correcting the OSD triggering region offset according to claim 1, wherein acquiring the rotary angle parameter of the multimedia display device when the multimedia display device is monitored rotating comprises:
    sampling a plurality of angle offset data of the multimedia display device in a predetermined time period, before quantizing the plurality of angle offset data and setting a rotation flag to tag a rotation; and
    acquiring a value of the rotation flag, and calculating the rotary angle parameter of the multimedia display device when the rotation is monitored.

3. The method for correcting the OSD triggering region offset according to claim 2, wherein acquiring the first coordinate parameter for the OSD displaying region of the multimedia display device according to the rotary angle parameter comprises:

acquiring a porch region of the multimedia display device beforehand, before acquiring a rotation flag and a rotary angle parameter in the porch region, wherein the porch region is limited within a physical base area defined by hardware display pixels, wherein only a content part within a range of the porch region is displayed and a content part out of the range of the porch region is not displayed by the multimedia display device; and acquiring a first horizontal axis starting coordinate and a first vertical axis starting coordinate of the OSD displaying region in the porch region, before acquiring a first horizontal coordinate offset and a first vertical coordinate offset of the OSD displaying region according to the rotary angle parameter, wherein the OSD displaying region is inside the porch region.

4. The method for correcting the OSD triggering region offset according to claim 3, wherein acquiring the second coordinate parameter for the OSD triggering region of the multimedia display device and determining whether the OSD displaying region coincides with the OSD triggering region according to the first coordinate parameter and the second coordinate parameter comprises:

acquiring a second horizontal axis starting coordinate and a second vertical axis starting coordinate of the OSD triggering region of the multimedia display device, and acquiring a second horizontal coordinate offset and a second vertical coordinate offset of the OSD triggering region;

comparing pairs of coordinates, including: the first horizontal axis starting coordinate and the second horizontal axis starting coordinate, the first vertical axis starting coordinate and the second vertical axis starting coordinate, the first horizontal coordinate offset and the second horizontal coordinate offset, and the first vertical coordinate offset and the second vertical coordinate offset; and in response to two coordinates in any of the pairs of coordinates not being equal to each other, determining that the OSD displaying region does not coincide with the OSD triggering region.

5. The method for correcting the OSD triggering region offset according to claim 2, wherein acquiring the value of the rotation flag, and calculating the rotary angle parameter of the multimedia display device when the rotation is monitored, comprises:

when the rotation flag is 1, a present multimedia display device has rotated; when the rotation flag is 0, the present multimedia display device has not rotated; when the multimedia display device is monitored rotating, the rotation flag is tagged as 1; when the value of the rotation flag is monitored as 1, encoding and calculating the rotary angle parameter of the multimedia display device.

6. The method according to claim 1, wherein the OSD displaying region deviating from the OSD triggering region due to rotation of the multimedia display device further causes display distortion.

7. A system for correcting an on-screen display (OSD) triggering region offset, comprising one or more angle sensors and a multimedia display device, wherein:

the one or more angle sensors are configured to acquire a rotary angle parameter of the multimedia display device when the multimedia display device is monitored rotating; and the multimedia display device is configured to:
acquire a first coordinate parameter for an OSD displaying region of the multimedia display device, according to the rotary angle parameter;
acquire a second coordinate parameter for an OSD triggering region of the multimedia display device, the OSD triggering region being a response area on the multimedia display device configured to be triggered for responding to OSD-related contact manipulation;
determine whether the OSD displaying region coincides with the OSD triggering region according to the first coordinate parameter and the second coordinate parameter when the multimedia display device is monitored rotating, wherein the OSD displaying region deviating from the OSD triggering region due to rotation of the multimedia display device causes OSD touch response trigger error; and
in response to the OSD displaying region not coinciding with the OSD triggering region, performing:
determining whether a number of repeating drawing reaches a threshold number;
in response to the number of repeating drawing the OSD not reaching the threshold number, drawing the OSD triggering region again until the OSD displaying region is detected coinciding with the OSD triggering region or until the number of repeating drawing the OSD reaching a threshold number, before finishing a correction of an OSD triggering region offset; and
in response to the number of repeating drawing the OSD reaching the threshold number, prompting a drawing failure message for an operation of screen normalization.

8. The system for correcting the OSD triggering region offset according to claim 7, wherein:

the one or more angle sensors are further configured to:
sample a plurality of angle offset data within a predetermined time period, quantize the plurality of angle offset data, and set a rotation flag to mark a rotation; and the multimedia display device is further configured to:
acquire a value of the rotation flag, and calculate the rotary angle parameter of the multimedia display device when the rotation is monitored.

9. The system for correcting the OSD triggering region offset according to claim 8, wherein the multimedia display device is further configured to:

acquire a porch region of the multimedia display device beforehand, before acquiring the rotation flag and the rotary angle parameter in the porch region; and
acquire a first horizontal axis starting coordinate and a first vertical axis starting coordinate of the OSD displaying region in the porch region, and acquire a first horizontal coordinate offset and a first vertical coordinate offset of the OSD displaying region according to the rotary angle parameter.

10. The system for correcting the OSD triggering region offset according to claim 9, wherein the multimedia display device is further configured to:

acquire a second horizontal axis starting coordinate and a second vertical axis starting coordinate of the OSD triggering region of the multimedia display device, and acquire a second horizontal coordinate offset and a second vertical coordinate offset of the OSD triggering region;

compare the first horizontal axis starting coordinate and the second horizontal axis starting coordinate, the first vertical axis starting coordinate and the second vertical axis starting coordinate, the first horizontal coordinate offset and the second horizontal coordinate offset, the first vertical coordinate offset and the second vertical coordinate offset in a turn, determine whether they are a same; and if they are not the same, determine that the OSD displaying region does not coincide with the OSD triggering region and drawing the OSD triggering region again, until the OSD displaying region is detected coinciding with the OSD triggering region, before finishing the correction of the OSD triggering region offset.

11. The system for correcting the OSD triggering region offset according to claim 8, wherein the multimedia display device is further configured to:

when the rotation flag is 1, determine that the multimedia display device has rotated, when the rotation flag is 0, determine that the multimedia display device has not rotated; when the multimedia display device is monitored rotating, the rotation flag is tagged as 1; and when the value of the rotation flag is monitored as 1, encode and calculate the rotary angle parameter of the multimedia display device.

* * * * *